(12) United States Patent
Dunne et al.

(10) Patent No.: US 8,454,727 B2
(45) Date of Patent: Jun. 4, 2013

(54) TREATMENT OF NATURAL GAS FEEDS

(75) Inventors: Stephen R. Dunne, Algonquin, IL (US); Pamela J. Dunne, legal representative, Algonquin, IL (US); Lubo Zhou, Inverness, IL (US); Peter K. Coughlin, Mundelein, IL (US)

(73) Assignee: UOP LLC, Des Plaines, IL (US)

( * ) Notice: Subject to any disclaimer, the term of this patent is extended or adjusted under 35 U.S.C. 154(b) by 261 days.

(21) Appl. No.: 13/099,883

(22) Filed: May 3, 2011

(65) Prior Publication Data
US 2011/0290111 A1 Dec. 1, 2011

Related U.S. Application Data

(60) Provisional application No. 61/349,445, filed on May 28, 2010.

(51) Int. Cl.
*B01D 53/22* (2006.01)

(52) U.S. Cl.
USPC ............... 95/51; 95/43; 95/45; 95/90; 96/4

(58) Field of Classification Search
USPC ............... 95/43, 45, 51, 90, 148; 96/4
See application file for complete search history.

(56) References Cited

U.S. PATENT DOCUMENTS

| | | | |
|---|---|---|---|
| 3,938,972 A | 2/1976 | Sugimura | |
| 4,604,988 A | 8/1986 | Rao | |
| 4,693,822 A | 9/1987 | Bowe et al. | |
| 4,836,833 A * | 6/1989 | Nicholas et al. | 95/55 |
| 5,116,396 A * | 5/1992 | Prasad et al. | 62/655 |
| 5,259,869 A * | 11/1993 | Auvil et al. | 95/52 |
| 5,326,385 A | 7/1994 | Rajani et al. | |
| 5,411,721 A * | 5/1995 | Doshi et al. | 423/220 |
| 5,486,227 A | 1/1996 | Kumar et al. | |
| 5,558,698 A | 9/1996 | Baker et al. | |
| 5,738,712 A | 4/1998 | Hyppanen | |
| 5,964,923 A * | 10/1999 | Lokhandwala | 95/50 |
| 6,205,813 B1 * | 3/2001 | Shah et al. | 62/630 |
| 6,579,343 B2 | 6/2003 | Brennecke et al. | |
| 6,782,714 B2 | 8/2004 | Iijima et al. | |
| 6,881,389 B2 | 4/2005 | Paulsen et al. | |
| 6,932,858 B2 | 8/2005 | Nicol et al. | |

(Continued)

FOREIGN PATENT DOCUMENTS

| | | |
|---|---|---|
| WO | 2008116864 A1 | 10/2008 |
| WO | 2009020473 A1 | 2/2009 |

(Continued)

*Primary Examiner* — Jason M Greene
*Assistant Examiner* — Anthony Shumate
(74) *Attorney, Agent, or Firm* — Mark Goldberg

(57) ABSTRACT

The present invention provides a process for treating a natural gas stream comprising sending a natural gas stream to at least one membrane unit to produce a permeate stream containing a higher concentration of carbon dioxide and a retentate stream containing a lower concentration of carbon dioxide. Then the retentate stream is sent to an adsorbent bed to remove carbon dioxide and other impurities to produce a natural gas product stream. The regeneration gas stream is sent through the molecular sieve adsorbent bed to desorb the carbon dioxide. In one process flow scheme, the regeneration stream is combined with the permeate stream from the membrane unit. Then the combined stream is sent to an absorbent column to remove carbon dioxide from the permeate stream to produce a second natural gas product stream. In the alternative flow scheme, a second membrane unit is used to improve efficiency.

17 Claims, 2 Drawing Sheets

U.S. PATENT DOCUMENTS

| | | | | |
|---|---|---|---|---|
| 7,047,764 | B2 | 5/2006 | Sawchuk et al. | |
| 7,074,322 | B2 | 7/2006 | Sawchuk et al. | |
| 7,083,662 | B2 | 8/2006 | Xu et al. | |
| 7,114,351 | B2 | 10/2006 | Jones, Jr. et al. | |
| 7,131,272 | B2 | 11/2006 | Jones, Jr. et al. | |
| 7,147,691 | B2 | 12/2006 | Palmer | |
| 7,168,265 | B2 | 1/2007 | Briscoe et al. | |
| 7,231,784 | B2 | 6/2007 | Howard et al. | |
| 7,243,510 | B2 | 7/2007 | Jones, Jr. et al. | |
| 7,251,956 | B2 | 8/2007 | Sawchuk et al. | |
| 7,322,387 | B2 | 1/2008 | Landry et al. | |
| 7,396,388 | B2 | 7/2008 | Mitariten | |
| 7,424,999 | B2 | 9/2008 | Xu et al. | |
| 7,429,287 | B2 | 9/2008 | Frantz | |
| 7,442,231 | B2 | 10/2008 | Landrum | |
| 7,442,233 | B2 | 10/2008 | Mitariten | |
| 7,500,370 | B2 | 3/2009 | Coward | |
| 7,527,775 | B2 | 5/2009 | Chinn et al. | |
| 7,537,641 | B2 | 5/2009 | Lokhandwala et al. | |
| 7,591,149 | B2 | 9/2009 | Ransbarger et al. | |
| 7,600,395 | B2 | 10/2009 | Eaton et al. | |
| 7,637,984 | B2 * | 12/2009 | Adamopoulos | 95/45 |
| 7,678,349 | B2 | 3/2010 | Sawchuk et al. | |
| 7,780,933 | B2 | 8/2010 | Kikkawa et al. | |
| 7,803,215 | B2 | 9/2010 | Russell et al. | |
| 8,088,200 | B2 | 1/2012 | Wagner et al. | |
| 8,211,211 | B1 * | 7/2012 | Knaebel | 95/96 |
| 8,221,524 | B2 * | 7/2012 | Mitariten | 95/54 |
| 2004/0060334 | A1 | 4/2004 | Palmer | |
| 2005/0129598 | A1 | 6/2005 | Chinn et al. | |
| 2007/0240449 | A1 | 10/2007 | Howard et al. | |
| 2008/0000350 | A1 * | 1/2008 | Mundschau et al. | 95/56 |
| 2008/0127655 | A1 | 6/2008 | Landry et al. | |
| 2008/0210092 | A1 | 9/2008 | Buckles et al. | |
| 2009/0013697 | A1 | 1/2009 | Landry et al. | |
| 2009/0130007 | A1 | 5/2009 | Dickinson et al. | |
| 2009/0205365 | A1 | 8/2009 | Van Aken et al. | |
| 2011/0239862 | A1 | 10/2011 | Davydov | |
| 2012/0079852 | A1 * | 4/2012 | Northrop et al. | 62/620 |
| 2012/0103185 | A1 * | 5/2012 | Vaidya et al. | 95/11 |
| 2012/0111192 | A1 * | 5/2012 | Nazarko et al. | 95/51 |
| 2012/0210870 | A1 * | 8/2012 | Gerard et al. | 95/45 |

FOREIGN PATENT DOCUMENTS

| | | |
|---|---|---|
| WO | 2009087155 A1 | 7/2009 |
| WO | 2009087156 A1 | 7/2009 |
| WO | 2009124372 A2 | 10/2009 |

\* cited by examiner

TREATMENT OF NATURAL GAS FEEDS

CROSS-REFERENCE TO RELATED APPLICATION

This application claims priority from Provisional Application No. 61/349,445 filed May 28, 2010, the contents of which are hereby incorporated by reference.

BACKGROUND OF THE INVENTION

This invention relates to a process for removing impurities from natural gas feeds. More particularly, this invention relates to a process for removal of impurities including carbon dioxide, hydrogen sulfide, water and mercury from natural gas in a floating environment, such as a ship, prior to liquefaction.

A new type of vessel is being developed that may revolutionize offshore production of natural gas. The gas industry is currently planning to build a fleet of ships or barges that can be sailed or towed to the site of offshore gas deposits, extract the gas, pretreatment the natural gas to remove impurities, then liquefy it to become LNG and then offload the LNG to tankers for shipping to market. It is hoped that these floating liquefied natural gas (FLNG) ships will be cheaper to use than building onshore pretreatment and liquefaction facilities, speed up the time to bring fields on stream and make it economical to exploit small and remote offshore gas fields. It has been estimated that over ⅙ of global gas reserves are in such fields. There are also security advantages to producing gas offshore in some parts of the world instead of in onshore facilities. In addition, the use of FLNG vessels avoids impacting onshore wildlife habitats and the need to move communities due to the onshore space needed for land based facilities.

In LNG service, the natural gas has to be cleaned before it is sent to a liquefaction unit. Generally, the treated gas $CO_2$ concentration has to be below 50 ppm to avoid formation of solids that interfere with the liquefaction process. The use of an amine solvent is a well known process and is an accepted technology for land based LNG pretreatment. For offshore FLNG service, however, there are at least two problems associated with use of a solvent process. First, footprint and weight are two important parameters for the ship and platform builder. When an acid gas such as $CO_2$ is present at an increased concentration in a natural gas feed, the amine absorption column diameter and the amine solvent circulation rate that is needed significantly increases, which results in large footprint and heavy weight of the amine unit. Second, motion at high sea stages often generates flow mal-distribution inside the amine absorbers and stripping regenerators. This flow mal-distribution results in low separation efficiency of the amine systems. Hence, the natural gas product from the amine treatment may not be able to meet the specifications for acid gas content such as $CO_2$ required for liquefaction processes.

Floating liquefied natural gas (FLNG) is a new field that requires carefully optimized pre-treatment and processing options for the removal of $CO_2$, $H_2S$, water and mercury and other trace contaminants. $CO_2$ is one of the contaminants with the highest concentration in the feed gas and its removal poses special challenges to the FLNG application. The problem of pre-treatment can be said to be one of minimizing foot print and weight of the combined treatment train while maximizing the reliability of the treatment train. The use of amines in absorption units to remove $CO_2$ is one of the preferred ways of handling the pre-treatment problem for onshore applications. However, for FLNG applications, motion at high sea stage often generates flow mal-distribution inside the amine absorber and stripping regenerator, which results in risk of not meeting the low $CO_2$ concentration (<50 ppm) spec in the treated gas. This invention allows for a hybrid membrane, amine and molecular sieve treatment option that is substantially free of problems associated with rocking. At the same time, this optimized hybrid system provides an option that has no membrane permeate venting, hence, significantly reduces hydrocarbon loss.

SUMMARY OF THE INVENTION

The present invention provides a process for treating a natural gas stream comprising sending a natural gas stream to at least one membrane unit to produce a permeate stream containing a higher concentration of carbon dioxide than the natural gas stream and a retentate stream containing a lower concentration of carbon dioxide than the natural gas stream. Then the retentate stream is sent to a molecular sieve adsorbent bed to remove carbon dioxide and other impurities from the retentate stream to produce a natural gas product stream. The regeneration gas stream is sent through the molecular sieve adsorbent bed to desorb the carbon dioxide. The present invention provides two process flow schemes for natural gas treatment. In a first embodiment, the regeneration stream from the molecular sieve adsorbent beds is combined with the permeate stream from the membrane. Then the combined stream is sent to an absorbent column to remove carbon dioxide and other acid gases to produce a low acid gas concentration natural gas stream, which is sent to either the membrane or the molecular sieve adsorbent beds. The alternative process flow scheme for treating a natural gas stream comprises sending a natural gas stream to at least one membrane unit (first membrane unit) to produce a permeate stream containing a higher concentration of carbon dioxide than the natural gas stream and a retentate stream containing a lower concentration of carbon dioxide than the natural gas stream. Then the retentate stream is sent to the molecular sieve adsorbent beds to remove carbon dioxide and other impurities from the retentate stream to produce a natural gas product stream. The regeneration gas stream is sent through the molecular sieve adsorbent bed to desorb the carbon dioxide and then is sent with the carbon dioxide to at least another membrane unit (second membrane unit) to remove carbon dioxide and other impurities. The retentate stream from second membrane unit is sent to the molecular sieve adsorbent beds. The permeate streams from first and second membranes unit are combined and sent to an absorption column to remove carbon dioxide and other acid gases to produce a second natural gas product stream, which is sent to either the first membrane unit or the molecular sieve unit.

DETAILED DESCRIPTION OF THE INVENTION

Ideally the treating process would be limited to the use of a combination of membranes and molecular sieve treaters to replace the amine columns that are frequently used for $CO_2$ removal from natural gas. The motivation to eliminate the amine columns stems from the flow mal-distribution of the absorber/regenerator in the amine unit due to motion in a floating application. However, this process option inevitably produces a membrane permeate stream that has substantial amounts of hydrocarbon that would be wasted if not recovered. The process of the present invention places an amine column in a location so as to receive permeate gas from the membranes and/or regenerant gas from the molecular sieve column and to remove $CO_2$ and other impurities from that gas to a level commensurate with re-introducing the product gas from the amine column back to either before the membrane unit or to a location immediately upstream of the molecular sieve treater. The latter location may be optimal in some situations but it is within the scope of the present invention to reintroduce the product gas to other locations within the system. By treating the permeate streams from the membranes and the regeneration stream from the molecular sieve treaters, we can scrub $CO_2$ from the gas streams and render them amenable to blending into feeds for the hybrid process.

The process of the present invention is designed to achieve products meeting purity specifications and that minimize the degree to which a rocking motion of a treatment facility due to its being on a ship impacts product purity. A more reliable system with minimal hydrocarbon loss can be developed based on the proposed flow schemes. In this process a recompressed membrane permeate stream containing at least a portion of the $CO_2$ rejected from the membranes is sent to an amine unit to recover hydrocarbons. The balance of the $CO_2$ is then adsorbed by the molecular sieve unit and is rejected in the regeneration raffinate stream. This raffinate stream has a small boost blower to provide pressure to drive the gas to where it is blended with the permeate and treated by the amine unit, or to another membrane unit to remove $CO_2$ and other impurities. As described herein the specification for the amine product need only be about what we are feeding to the molecular sieve treater or membrane units, about 1 to 5 vol-% as compared to the need in alternate schemes to produce a product at <50 ppm (v/v) when the amine unit is the primary treatment option for $CO_2$. A representative liquid feed is a fresh absorbent or solvent, which may include make up and/or recycled absorbent, as discussed above. Examples of absorbents that are particularly effective as chemical solvents for removing acid gases include organic amines and particularly alkanolamines (e.g., monoethanolamine (MEA), methyldiethanolamine (MDEA), and diethanolamine (DEA)), and alkanolamines with activators such as MDEA with piperazine.

Figure 1:
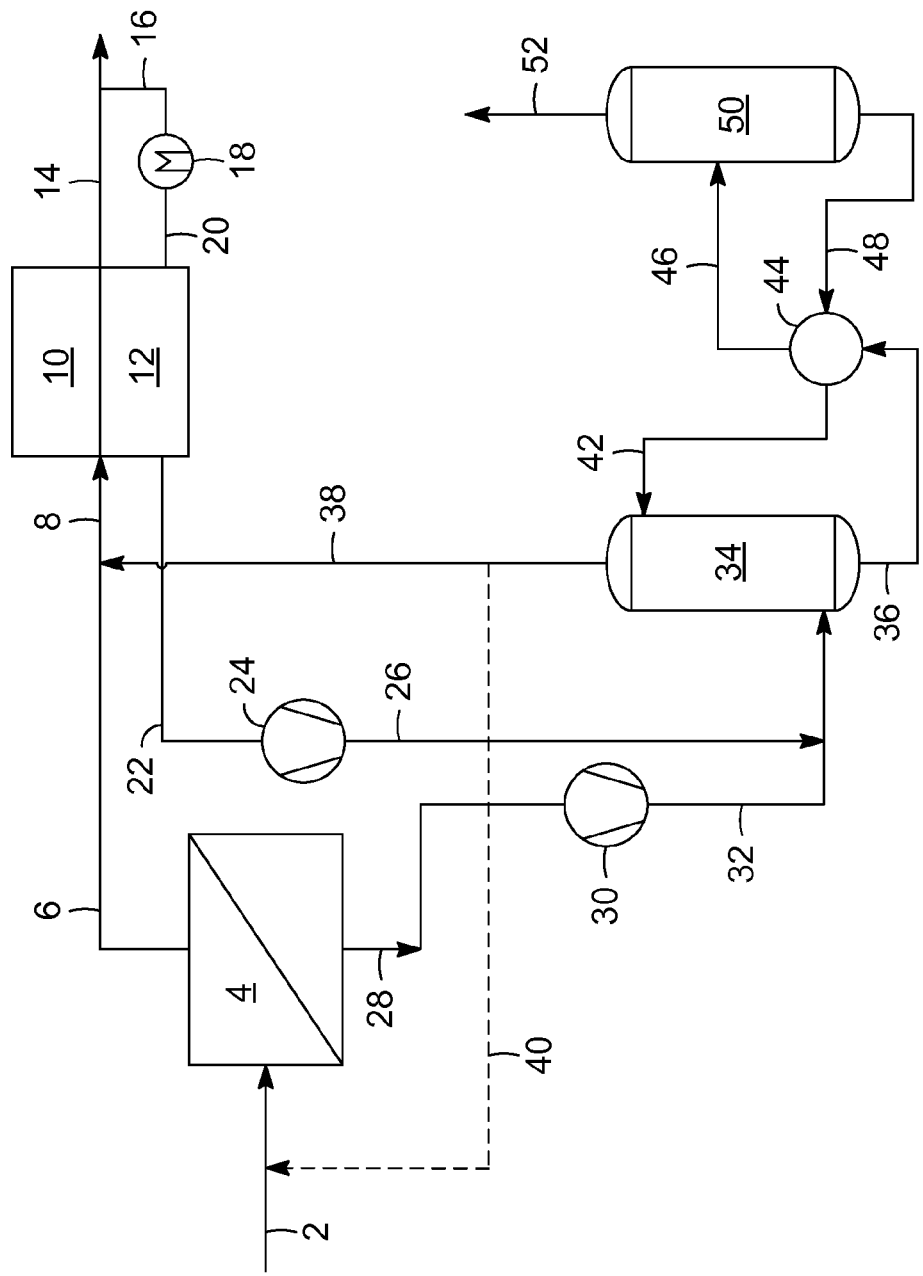
FIG. 1 shows the steps in a process to treat natural gas in a hybrid treatment system that mitigates the effect of rocking services and minimizes loss of hydrocarbon during a natural gas treatment process.
Figure 2:
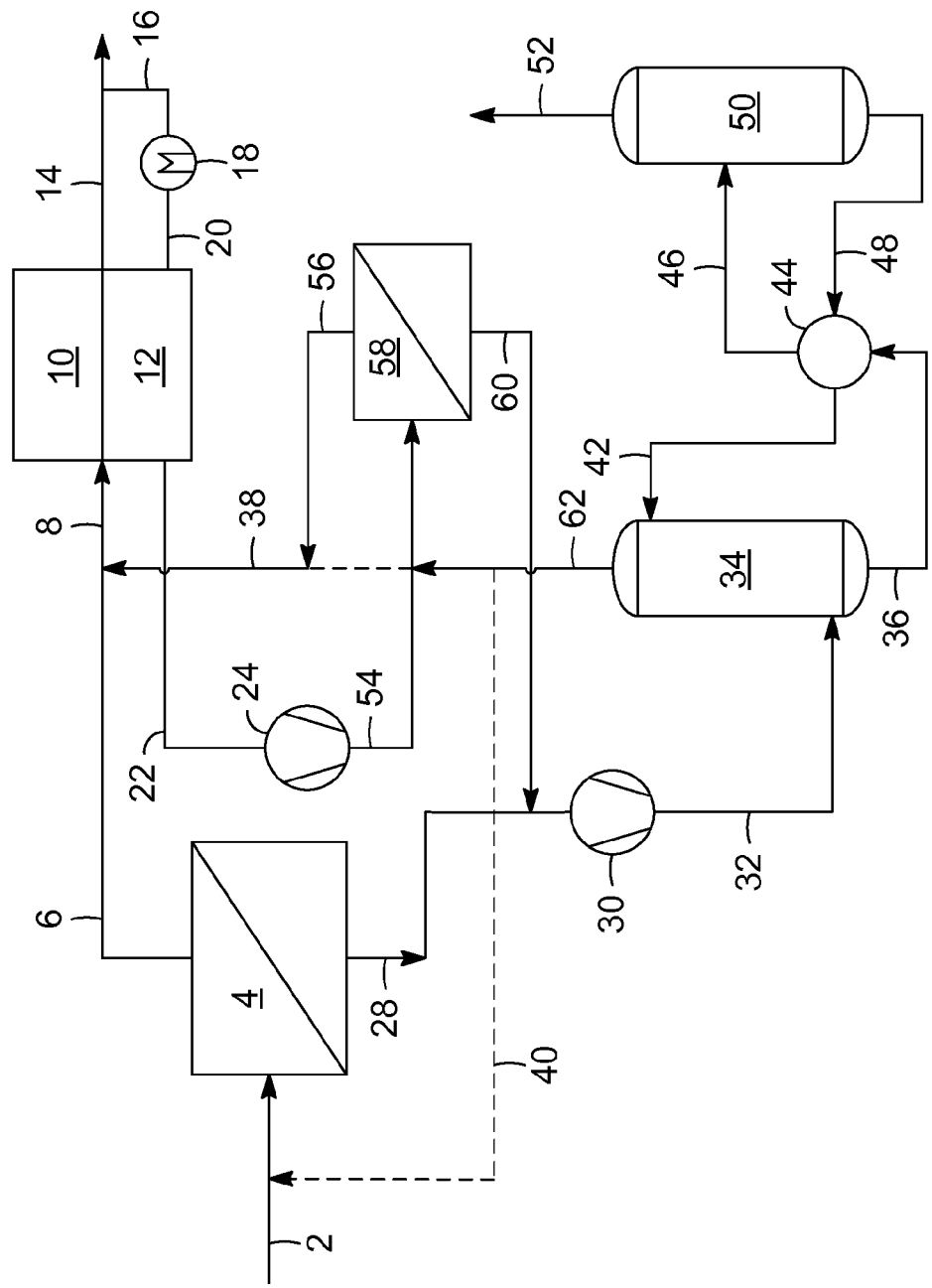
FIG. 2 shows an alternate process to treat natural gas in a hybrid treatment system having a second membrane unit.

FIGS. 1 and 2 show the steps that are taken in treating a natural gas stream in accordance with the present invention. The process is intended to take place on an ocean vessel, such as a ship, although this process could also be conducted in a land based facility. In the removal of contaminants, such as acid gases and other contaminants (e.g., $CO_2$, $H_2S$, sulfur oxides, and nitrogen oxides), from an impure gas (e.g., natural gas comprising predominantly methane), the membrane unit can achieve the bulk or main removal of these contaminants, while the molecular sieve adsorbent bed can serve as a "finishing" or "polishing" zone to more completely purify the impure gas and then the absorbent column can purify a permeate stream that contains impurities that are removed by the membrane unit while reducing loss of methane contained in the permeate stream. The invention also provides for the purification of the stream that is used in the regeneration of the molecular sieve adsorbent bed. In FIG. 1, a natural gas stream 2 is shown going to membrane units 4. The membrane units 4 may comprise multiple membrane elements within a membrane assembly as known to those skilled in the art. The membrane units will produce a permeate stream 28 that comprises methane and is more highly concentrated in impurities such as carbon dioxide and a retentate stream 6 comprising methane that is less concentrated in impurities such as carbon dioxide. The retentate stream 6 after being combined with an amine treated product gas 38 is sent through line 8 to an adsorbent bed 10 containing a molecular sieve adsorbent such as a zeolite or alumina material that adsorbs impurities such as carbon dioxide from the retentate stream. A resulting product stream 14 can then be liquefied or sent through a pipeline or otherwise be available for use. A portion 16 of the product stream 14 is sent through a heater 18, such as a gas heater to produce a heated regeneration gas 20 that passes through adsorbent bed 12 from which carbon dioxide and other impurities are desorbed. After desorption of carbon dioxide and other impurities, the adsorbent bed 12 is ready to be used to remove impurities as shown by adsorbent bed 10. After passing through adsorbent bed 12, a resulting raffinate stream 22 is pressured up by blower 24 and sent in line 26 to be combined with a compressed permeate stream 32 that is shown first leaving membrane unit 4 in line 28, be compressed in compressor 30 to become compressed gas 32. Compressed gas 32 combined with stream 26 passes to an amine unit 34 to remove carbon dioxide that exits in line 36 together with other gases. The gas in line 36 then passes through heat exchanger 44 to line 46 and then to a second amine unit 50. The acid gas is shown exiting at line 52. A treated stream is shown exiting the bottom section of amine unit 50, through heat exchanger 44 and returning to the first amine unit 44. An amine treated product gas stream 38 is shown being combined with retentate gas stream 6 or all or a portion of an amine treated product stream 40 may be combined with the natural gas stream 2.

An alternative flow scheme is shown in FIG. 2. In FIG. 2, a natural gas stream 2 is shown going to membrane units 4. The membrane units 4 may comprise multiple membrane elements within a membrane assembly as known to those skilled in the art. The membrane units will produce a permeate stream 28 that comprises methane and is more highly concentrated in impurities such as carbon dioxide and a retentate stream 6 comprising methane that is less concentrated in impurities such as carbon dioxide. The retentate stream 6 after being combined with stream 38 is sent through line 8 to an adsorbent bed 10 containing a molecular sieve adsorbent such as a zeolite or alumina material that adsorbs impurities such as carbon dioxide from the retentate stream. A resulting product stream 14 can then be liquefied or sent through a pipeline or otherwise be available for use. A portion 16 of the product stream 14 is sent through a heater 18, such as a gas heater to produce a heated regeneration gas 20 that passes through adsorbent bed 12 from which carbon dioxide and other impurities are desorbed. After desorption of carbon dioxide and other impurities, the adsorbent bed 12 is ready to be used to remove impurities as shown by adsorbent bed 10. After passing through adsorbent bed 12, a resulting raffinate stream 22 is pressured up by blower 24 and sent in line 54 to be combined with a product stream 62 that is from the absorber 46. The combined stream is sent to another membrane unit 58 that may be a single or multiple membrane units. The retentate stream 56 from membrane 58 is sent back to the absorber bed 10. A permeate stream 60 is combined with the other permeate stream 28 from membrane units 4, and the combined stream passes through compressor 30 to increase the pressure for the absorber feed stream 32, which passes to an amine unit 34 to remove carbon dioxide that exits in line 36, together with other gases. The gas in line 36 then passes through heat exchanger 44 to line 46 and then to a second amine unit 50. The acid gas is shown exiting at line 52. A treated stream is shown exiting the bottom section of amine unit 50, through heat exchanger 44 and returning to the first amine unit 34. An amine treated product gas stream 62 is shown being combined with gas stream 54 from the blower or all or a portion of an amine treated product stream 62 may be combined with the natural gas stream 2, or retentate gas stream 56.

The invention claimed is:

1. A process for treating a natural gas stream comprising:
    sending said natural gas stream to at least one membrane unit to produce a permeate stream containing a higher concentration of carbon dioxide than said natural gas stream and a retentate stream containing a lower concentration of carbon dioxide than said natural gas stream;
    sending said retentate stream to an adsorbent bed to remove carbon dioxide and other impurities from said retentate stream to produce a natural gas product stream;
    sending a regeneration gas stream through said molecular sieve adsorbent bed to desorb said carbon dioxide and then sending said regeneration gas stream with said carbon dioxide to be combined with said permeate stream; and
    sending said permeate stream to an absorbent column to remove carbon dioxide from said permeate stream to produce a second natural gas product stream.

2. The process of claim 1 wherein said permeate stream is compressed before entering said absorbent column.

3. The process of claim 1 wherein said regeneration gas is increased in pressure before being combined with said permeate stream.

4. The process of claim 1 wherein said regeneration gas is a portion of said natural gas product stream.

5. The process of claim 1 wherein said process takes place on a floating platform on an ocean.

6. The process of claim 5 wherein said floating platform is a ship.

7. The process of claim 1 wherein said second natural gas product stream is combined with said natural gas stream.

8. The process of claim 1 wherein said second natural gas product stream is combined with said retentate stream.

9. A process for treating a natural gas stream comprising:
    sending said natural gas stream to at least one membrane unit to produce a permeate stream containing a higher concentration of carbon dioxide than said natural gas stream and a retentate stream containing a lower concentration of carbon dioxide than said natural gas stream;
    sending said retentate stream to an adsorbent bed to remove carbon dioxide and other impurities from said retentate stream to produce a natural gas product stream;
    sending a regeneration gas stream through said molecular sieve adsorbent bed to desorb said carbon dioxide and then sending said regeneration gas stream with said carbon dioxide to another membrane unit to remove carbon dioxide and other impurities
    sending said permeate streams from both membrane units to an absorbent column to remove carbon dioxide from said permeate streams to produce a second natural gas product stream.

10. The process of claim 9 wherein said permeate streams are combined and compressed before entering said absorbent column.

11. The process of claim 9 wherein said regeneration gas is increased in pressure before being sent to the membrane unit.

12. The process of claim 9 wherein said regeneration gas is a portion of said natural gas product stream.

13. The process of claim 9 wherein said process takes place on a floating platform on an ocean.

14. The process of claim 9 wherein said floating platform is a ship.

15. The process of claim 9 wherein said second natural gas product stream is combined with said natural gas stream.

16. The process of claim 9 wherein said second natural gas product stream is combined with said retentate stream to the adsorber.

17. The process of claim 9 wherein said second natural gas product stream is combined with regeneration stream to the membrane unit.

* * * * *